United States Patent [19]

Renehan

[11] Patent Number: 5,123,238
[45] Date of Patent: Jun. 23, 1992

[54] HARVESTER

[75] Inventor: Desmond L. Renehan, Wallaga Lake Heights, Australia

[73] Assignee: Nut Research Company of Australia PTY Limited, New South Wales, Australia

[21] Appl. No.: 652,580

[22] Filed: Feb. 8, 1991

[30] Foreign Application Priority Data

Feb. 9, 1990 [AU] Australia ................ PJ8543

[51] Int. Cl.⁵ .................. A01D 46/26; A01D 46/22
[52] U.S. Cl. ........................ 56/329; 56/340.1
[58] Field of Search ...................... 56/340.1, 329

[56] References Cited

U.S. PATENT DOCUMENTS

| 2,714,281 | 8/1955 | Steele | 56/329 |
| 3,407,582 | 10/1968 | Poehlmann | 56/329 |
| 3,505,801 | 4/1970 | Nye | 56/329 |
| 3,596,455 | 8/1971 | Adrian | 56/340.1 X |
| 3,623,308 | 11/1971 | Nye | 56/340.1 |
| 4,545,187 | 10/1985 | Landgraf | 56/340.1 X |

Primary Examiner—Stephen J. Novosad
Attorney, Agent, or Firm—Kane, Dalsimer, Sullivan, Kurucz, Levy, Eisele and Richard

[57] ABSTRACT

A harvester operable to shake a plant to jar produce therefrom is formed as a unit which may be carried on a tractor which also serves as a power source therefor. At one end, the unit may be connected to a tractor to extend longitudinally thereof. At its opposite end, the unit has a shaking mechanism having jaws for gripping the plant. The unit also includes a foldable catching portion which is movable from a closed position to a catching position surrounding the trunk of the plant held between its jaws.

12 Claims, 4 Drawing Sheets

HARVESTER

FIELD OF THE INVENTION

The invention relates to a harvester for nuts, fruit, pods, cones and other crops (hereinafter generally referred to as fruit) which grow on trees, shrubs, vines, and similar plants. In particular, the invention concerns a harvester which includes means operable to shake the plant to jar the produce therefrom. Such a harvester will be referred to as a harvester of the type described.

DESCRIPTION OF PRIOR ART

One known harvester of this type, which is used for harvesting nuts, comprises a heavy vehicle which may be driven to a position adjacent a tree. The vehicle carries a hydraulically operated boom which, at its free end, has a shaker head with jaws movable to grip the trunk or branch of a tree. Shaking the tree results in the produce falling to the ground.

There are several disadvantages associated with this known harvester. As the harvester is only used for short periods during the year, this expensive piece of equipment spends most of its life in storage. Due to the position at which the boom is mounted, the vehicle often moves close to a tree and, due to its weight, may compact the earth near the tree and possibly damage the root system of the tree. As the nuts fall to the ground, a preliminary step is required to clear the ground beneath the tree. This results in destruction or damage of the mulch and compatible plant and insect life existing beneath the tree. The fallen nuts are windrowed and then collected, for example, by a vacuum sweeper. The nuts are next separated from the accompanying debris, washed, dried and opened. In all, a very labour intensive activity, often involving the use of several different kinds of machine.

BRIEF SUMMARY OF INVENTION

It is an object of the invention to provide a harvester of the type described which may be carried on a tractor.

It is another object of the invention to provide a harvester of the type described with catching means to collect the produce jarred from the plant.

It is another object of the invention to provide a harvester of the type described which may be used with minimum risk of damage to the plant and the plant's natural habitat.

It is a further object of the invention to provide a harvester of the type described which will reduce the costs of harvesting.

The harvester according to the invention is in the form of a unit which may be mounted either at the front or at the rear on a standard tractor which may act both as a means of transport and as a power source for the various mechanical components of the unit. The harvester may be disengaged from the tractor and stored separately leaving the tractor free for other uses.

The harvester unit comprises a base adapted at one end to be connected to a tractor so as to extend longitudinally thereof. A suitable shaking mechanism is mounted on the base with its jaws, which are adapted to grip part of the plant, positioned adjacent to the free end of the base.

The unit also includes a foldable catching portion which is movable from a closed or folded position to an open or catching position surrounding the trunk of a plant held between the jaws. The catching portion may comprise a folding framework carrying a flexible member or members which in the open position extend outwardly from the trunk of the tree, preferably in a somewhat dish-shaped configuration. The catching portion has a collecting section through which the crop may pass, preferably, to a transfer mechanism such as a moving conveyor, or a blowing or vacuum conveyor, and thence to suitable containers.

Power from the tractor may be used to activate the mechanical components of the harvester such as the movable jaws, the foldable catching portion, the shaker head, the transfer mechanism, with the controls therefor positioned for convenient operation by the tractor driver. Only a single person is required to drive the tractor and position it with the shaker head adjacent a tree and to operate the controls for the various mechanisms.

BRIEF DESCRIPTION OF DRAWINGS

The invention will now be described in relation to the accompanying drawings in which.

DETAILED DESCRIPTION

Figure 1:
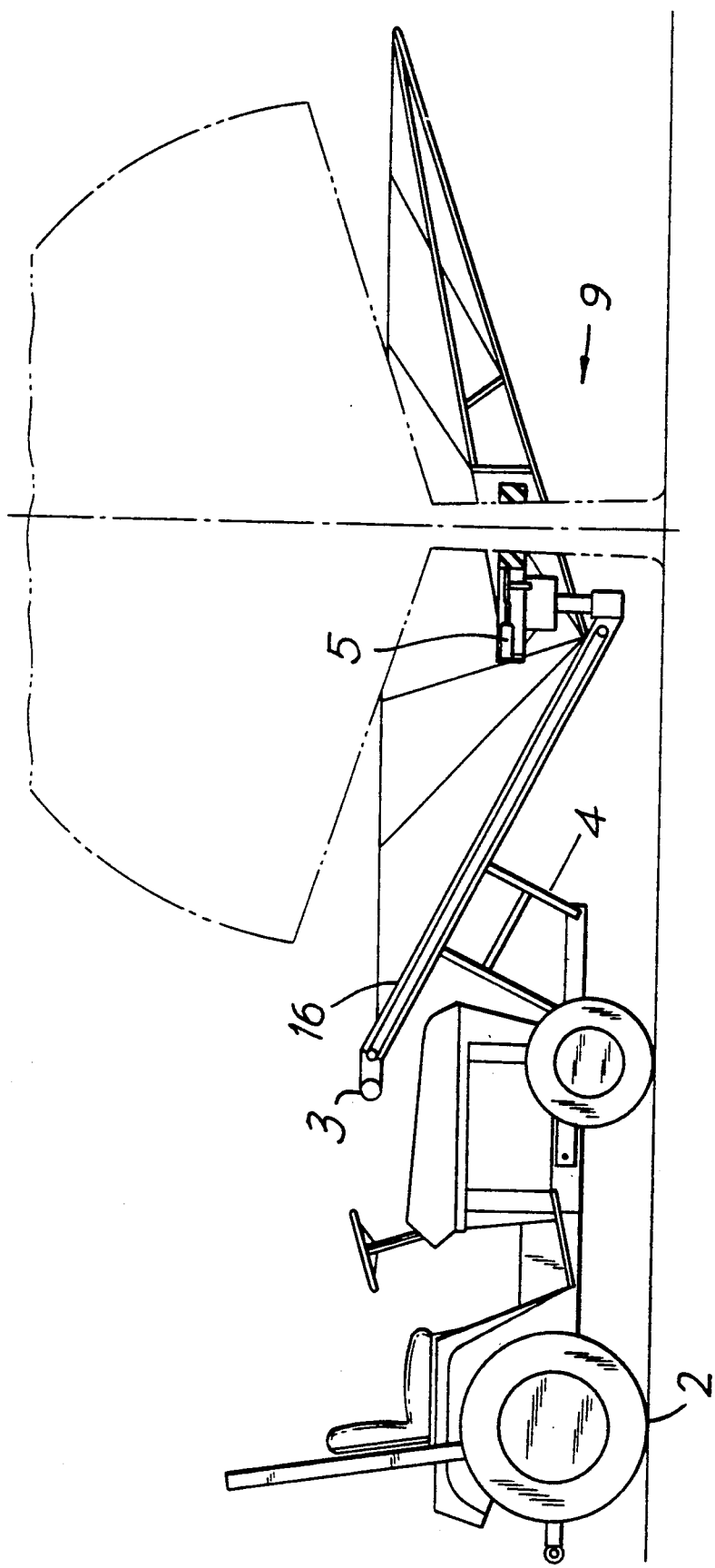
FIG. 1 is a side view, part elevational and part sectional, of the harvester attached to the front of a tractor and positioned adjacent a tree which is held by the gripping jaws of the harvester.

In the drawings, the harvester 1 is in the form of a separable unit carried on the front end of a standard tractor 2 so as to extend longitudinally thereof. The unit may be quickly and conveniently demounted from the tractor which may then be used for other activities. The unit comprises a base 3 which may be formed as a substantially rectangular frame which, when mounted on the front of the tractor 2 by support members 4, has its long dimension extending in the longitudinal direction of the tractor. At its front end, base 3 carries a shaking mechanism 5 which includes a pair of movable jaws 6 which, as shown, grip the trunk 7 of the tree. The internal surfaces of the jaws are provided with flexible pads 8 so as to minimise the possibility of damage to the tree by jaws 6.

The unit also includes a foldable catching portion 9 which is carried by base 3. Catching portion 9 may be made in two substantially symmetrical sections, each section including a framework comprising a plurality of pivoting arms carrying a sheet of foldable flexible material which forms the floor of catching portion 9. As shown in FIG. 1, in their open condition, the sections combine to form a substantially conical or dish-shaped catching portion 9 surrounding trunk 7 of the tree gripped by jaws 6.

Figure 2:
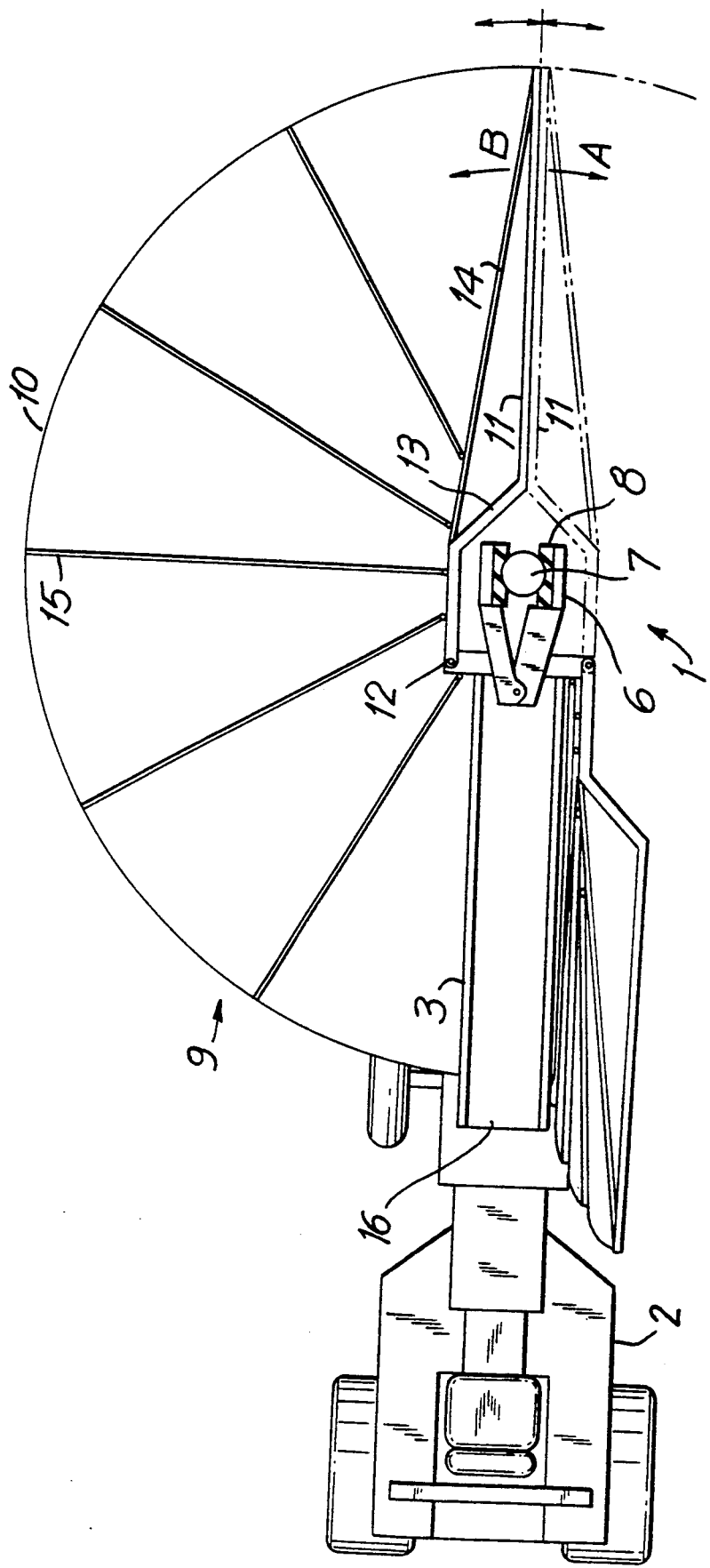
FIG. 2 is a plan view of FIG. 1 with part of the foldable catching portion in a closed or folded position and with another part in an open or catching position.

Each section may comprise a main arm 11 pivoted at 12 to the forward end of base 3. In the lower half of FIG. 2, main arm 11 is duplicated, shown both in its open position extending forwardly of base 3 and in its closed position lying adjacent the sides of base 3. Near its pivoted end, each main arm 11 has angled portions 13 which, in the open position of arms 11, form an open frame surrounding trunk 7. In their open position, the remaining portions of main arms 11 lie closely adjacent to one another. If desired, the main arms 11 may be strengthened by a strengthening member 14.

Each section has a plurality of secondary pivoting arms 15, each of which is pivoted at one end to base 3, main arm 11 or strengthening member 14. Each flexible member 10 is connected along the side of base 3, along the length of arm 11 and to each of the secondary arms 15. The flexible member 10 is preferably made of a mesh material such as shadecloth which allows the passage of wind therethrough.

Each flexible member 10 may be made in one piece. However, in the case of damage to a flexible member 10, the whole sheet has to be replaced. Accordingly, it is preferred to make flexible member 10 from a plurality of substantially sector-shaped pieces of material, each piece being carried by adjacent arms 15. Therefore, in the case of damage, probably the material of only one sector needs to be replaced. Furthermore, because the sectors are easily replaceable, sectors of different materials may be used for different fruits. For example, a softer material may be used for fruit liable to bruising.

A conveyor 16 extends from a collecting area near the lowest point of catching portion 9 to transfer collected produce to suitable receptacles (not shown).

In use, the unit is mounted on the front of tractor 2 with catching portion 9 in its closed or folded position lying adjacent the sides of base 3. The gripping jaws 6 are then the most forward part of the unit and are in direct line of sight of the tractor driver thereby facilitating steering jaws 6 into engagement with a tree. The unit is transported to the tree to be harvested which may be approached from any suitable angle. The harvester is positioned so that jaws 6 embrace trunk 7. The base 3 and the shaking mechanism 5 may be levelled to compensate for uneven or sloping ground by levelling mechanism built into the harvester. The levelling mechanism may also be used to align the gripping jaws 6 to a part of a tree that is at an angle to vertical. For example, the levelling mechanism may be made part of the support members 4. Thus, irrespective of attitude of the tractor, the harvester can adapt to the tree to be harvested.

After jaws 6 are activated to firmly grip the trunk 7, catching portion 9 is moved from its closed position to its open position surrounding trunk 7. This may be achieved by power operated opening means such as a hydraulic ram operating only on arms 11 as secondary arms 15 will pivot automatically as catching portion 9 opens. Shaker head of mechanism 5 is then operated to jar the produce from the tree and the produce falls by gravity into catching portion 9. The produce moves to the collecting area adjacent the lowermost point of catching portion 9 and is transferred by conveyor 16 to storage containers. Because the produce does not touch the ground, contamination of the crop by debris on the ground or by earth organisms is avoided.

When all produce has fallen from the tree and transferred out of catching portion 9, the movable conveyor 16 and the shaker head of mechanism 5 are stopped and jaws 6 released from trunk 7 and the catching portion 9 is moved from its open position to a closed position. The tractor then retreats from the tree and repeats the process on the next tree.

Figure 3:
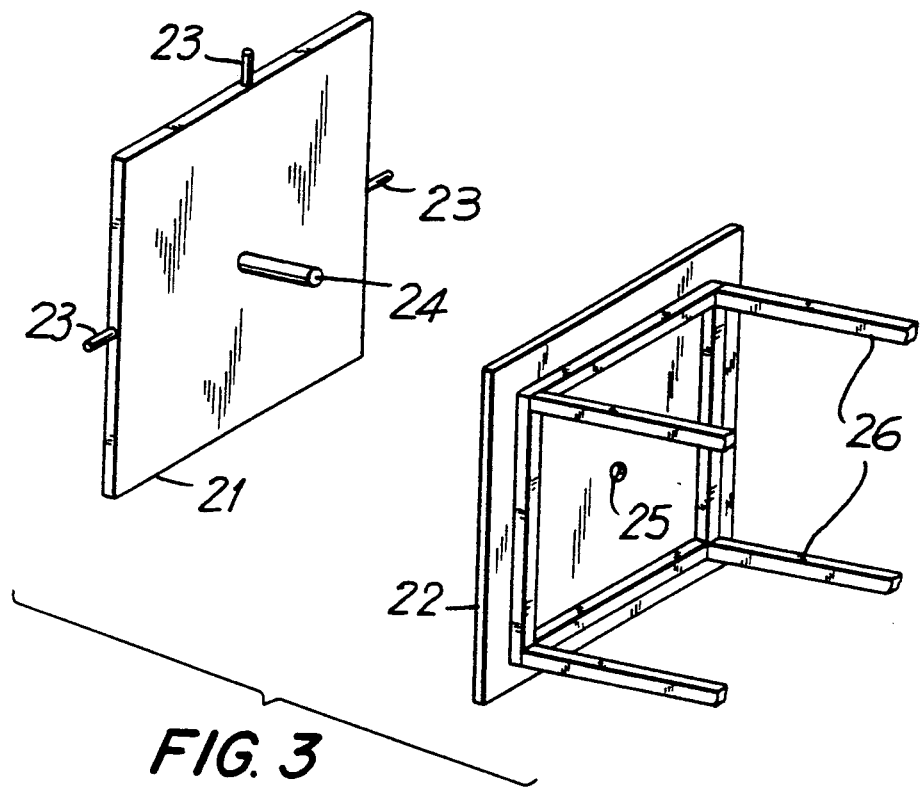
FIG. 3 is a perspective view illustrating another means for mounting the base of the harvester on a tractor.

Another means of mounting the base of the harvester on the tractor is illustrated in FIG. 3. The mounting means comprises two members in sliding engagement with one another so that the frame, which is carried by one of the members, may be turned about its longitudinal axis. As illustrated, the two members are in the form of flat plates 21 and 22. Plate 21 is provided with three connecting members 23 for attachment to the 3-point hitch of a tractor. Plate 22 carries base frame 26 of the harvester. The plates may be held together with the abutting faces in sliding engagement by any suitable means such as a bolt 24 projecting from plate 21 and passing through aperture 25 in plate 22 and secured by a nut (not shown). A hydraulic ram (not shown) may be operated to turn plate 22 with respect to plate 21 and thereby align the jaws 6 to that part of the tree to be gripped. Alignment of the gripping jaws in this way minimises the risk of damage to the tree.

Figure 4:
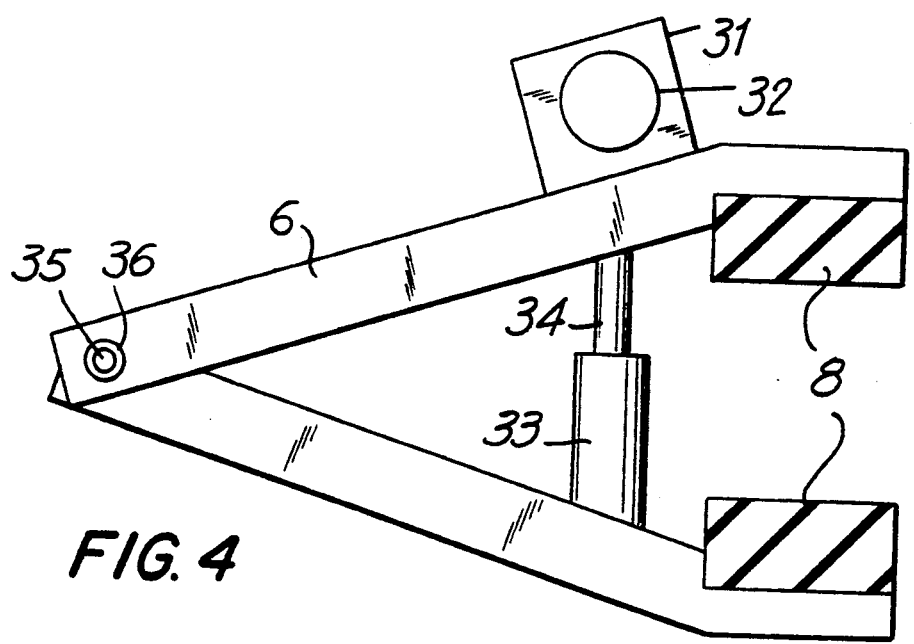
FIG. 4 is a plan view of the gripping jaws and associated equipment.

Further measures to minimise damage to the tree are described in relation to FIG. 4. The gripping jaws 6 are arranged to be self-centering. The jaws 6 are mounted on pivot pin 35 so as to be freely movable thereabout and towards their free ends are connected by a hydraulic ram comprising a cylinder 33 and a connecting rod 34. The hydraulic ram is operable to move the jaws 6 towards one another to grip a tree between pads 8. As soon as one pad contacts the tree, the movement of corresponding jaw 6 ceases. Only the other jaw continues to move until the second pad contacts the tree. Then, both jaws compress to grip the tree firmly. To provide further protection, it is preferred to surround pivot pin 35 with a flexible bush 36 to provide a resilient mounting of jaws 6 with respect to pivot pin 35.

As illustrated in FIG. 4, the housing 31 of a shaker head is mounted on the outside of one jaw 6 towards the free end thereof. The shaker head is operated by a hydraulic motor 32 mounted on housing 31. Housing 31 may be mounted on the inside or the outside of a jaw 6 and a similar shaker head may also be mounted on the other jaw.

It is preferred to support jaws 6 on a metal slide (not shown) located towards the free ends thereof. The lower sides of jaws 6 may be provided with nylon bearings to facilitate movement of jaws 6 with respect to the slide.

Figure 5:
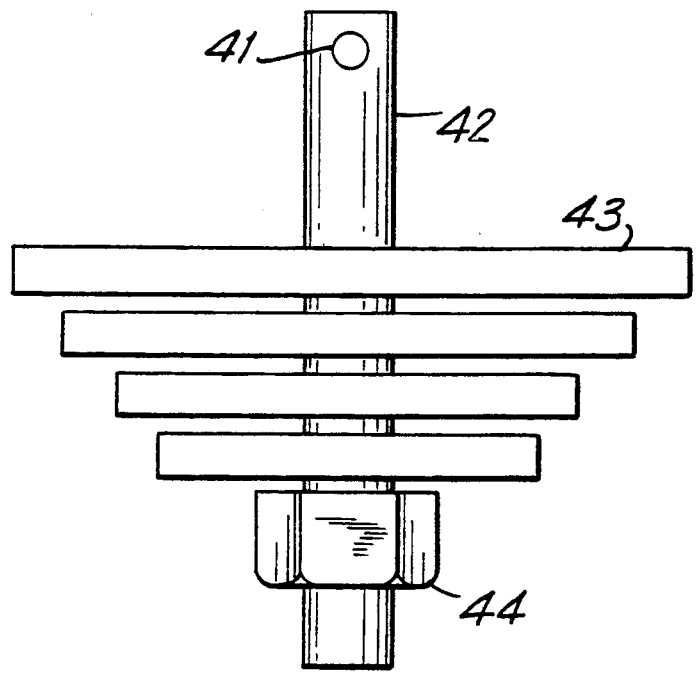
FIG. 5 is a sectional view of part of the shaker head.

The shaker head may be as illustrated in FIG. 5. A plurality of eccentrically mounted weights are rotated to provide the shaking forces. The weights may be in the form of plates 43 mounted on an arm 42 and held in position thereon by any suitable means such as a nut 44. Arm 42 is mounted on a shaft 41 which is adapted to be driven by hydraulic motor 32. The number and weight of plates 43, and the relative positions thereof, may be changed to alter the size of the shaking forces. By this means, the shaker head may be quickly adjusted to accord it to tree sizes and the type of fruit involved.

Figure 6:
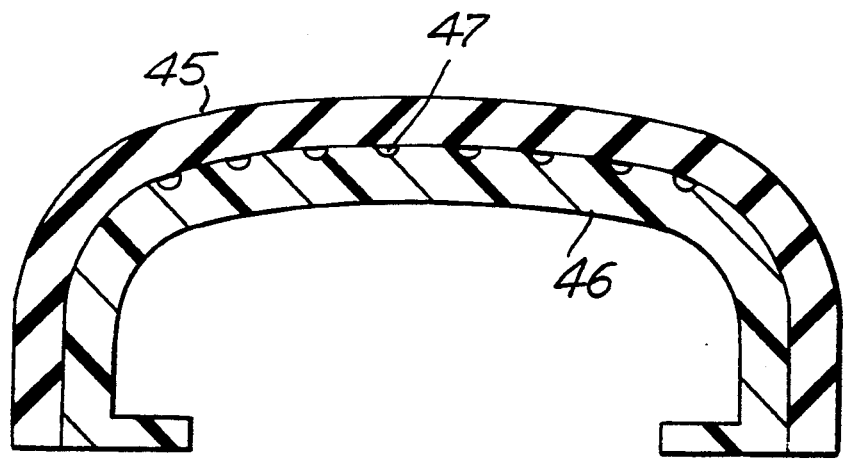
FIG. 6 is a sectional view of a flexible gripping pad.

It is preferred to construct pads 8 as illustrated by the sectional view of FIG. 6. The pad comprises an external resilient covering 45 made of rubber or a rubber-like composition of a resiliency to minimise damage to the tree. Covering 45 is mounted on a member 46 of substantially U-shaped cross-section, preferably made of polyurethene which incorporates some silicone. The external surface of member 46 is provided with a plurality of longitudinally extending channels 47. Air is forced along channels 47 to cool covering 45 and dissipate friction heat therefrom. Forced airflow may be obtained by suitably positioning the shaker head adjacent pad 8 and venting its housing to direct air on to pad 8.

Where a shaker head is mounted on each jaw, each may be driven by its own hydraulic motor. Alternatively, a single hydraulic motor may be provided to drive a pair of rotatable gears which may be connected to gears mounted on the shafts of the shaker heads by a chain drive. In this way, it is possible to synchronise the shaking forces of the two shaker heads. By using appropriate gearing, the shaker heads may be made to rotate in the same or opposite directions.

The various power devices for the various components of the harvester are not shown. It is suffice to say that the tractor constitutes a power source for each of those devices and that the various controls are mounted upon the tractor in convenient reach of the tractor driver. Power from the tractor may be transmitted to the harvester by any suitable means such as mechanical or hydraulic couplings.

As the jaws 6 are positioned at a significant distance from the front of tractor 2, it is possible to steer them into engagement with trunk 7 without the weight of the tractor encroaching on the main root area of the tree and compaction is avoided in this vital root area. Furthermore, mulch under the tree is not disturbed; nor is compatible plant and insect life.

By using the harvester of this invention, considerable savings of labour are achieved. There is no need to clear the area under the tree before harvesting commences. The steps of windrowing and collecting the crop from the ground are eliminated and processing the crop greatly simplified.

Although one embodiment of the invention has been described in relation to the drawings, it is emphasised that the invention is not restricted thereto. Some modifications have been mentioned and any other changes and modifications may be made within the broad concepts described, particularly to adapt for particular crops. For example, instead of moving conveyor 16, a vacuum conveyor, or a blowing conveyor could be used. Depending on the fruit involved, the collection section of the harvester may be fitted with a dehusker to shave or peel the husk from the fruit and deposit the debris around the base of a tree as a natural mulch. Again, a fruit sorting or grading equipment may be incorporated. The harvester described is especially suitable for the collection of nuts and the like, particularly pecan and macadamia nuts.

I claim:

1. A harvester comprising a base adapted to be carried by a tractor equipped with a three-point linkage so as to extend longitudinally thereof, said base being detachably connectable at one end to the three-point linkage of the tractor and having an opposite free end, a shaking mechanism mounted adjacent the free end of the base, said shaking mechanism having jaws extending beyond the free end of the base and operable to grip part of the plant to shake it to jar produce therefrom and a catching portion including movable members carried by the base and flexible material supported by the movable members to form a floor for the catching portion, wherein the movable members may be moved from a closed or folded position to an open or catching position under the plant, characterized in that mounting means to connect the base to a tractor comprises two plates in sliding contact with one another and joined so as to allow relative rotation, one plate having means for attachment to the three-point linkage of the tractor, the second plate being rigidly attached to the base, whereby rotation of the second plate turns the base about its longitudinal axis.

2. A harvester as claimed in claim 1, characterised in that the jaws are arranged to be self-centering about that part of the plant to be gripped by being mounted on a pivot pin so as to be freely movable thereabout and a hydraulic ram connected between the jaws is operable to provide relative movement of the jaws.

3. A harvester as claimed in claim 2, characterised in that a resilient bush is positioned between the pivot pin and the jaws to provide a resilient mounting for the jaws.

4. A harvester as claimed in claim 1, characterised in that resilient pads are mounted on the jaws to cover those parts of the jaws adapted to grip a plant.

5. A harvester as claimed in claim 4, characterised in that the resilient pads are formed with a plurality of channels for the passage of air for cooling purposes.

6. A harvester as claimed in claim 1, characterised in that the shaking mechanism and its jaws and the foldable catching portion are adapted to be activated by power from the tractor.

7. A harvester as claimed in claim 1, characterised in that the catching portion includes a collecting section to which the produce passes, wherein a movable conveyor is positioned adjacent the collecting section to transfer produce therefrom.

8. A harvester as claimed in claim 7, characterised in that the movable conveyor is adapted to be activated by power from the tractor.

9. A harvester as claimed in claim 1, characterised in that the shaking mechanism includes a shaker head comprising a plurality of eccentrically mounted weights adapted to be rotated to provide forces to shake the jaws.

10. A harvester as claimed in claim 9, characterised in that the weights are mounted so as to be readily detatchable and are interchangeable to alter the nature of the shaking forces.

11. A harvester as claimed in claim 1, wherein the movable members comprise a plurality of arms which are pivotally mounted with respect to the base, the arms in the closed position are moved to lie adjacent the base and in the open position are moved to extend around and under the plant.

12. A harvester as claimed in claim 1, wherein the flexible material is a mesh material which allows the passage of wind therethrough.

* * * * *